US 9,916,277 B2

(12) United States Patent
Hammel et al.

(10) Patent No.: US 9,916,277 B2
(45) Date of Patent: Mar. 13, 2018

(54) TRANSLATION OF UNIVERSAL ARMAMENT INTERFACE (UAI) TO MILITARY STANDARD (MIL-STD-1760) MESSAGING INTERFACE

(71) Applicant: Raytheon Company, Waltham, MA (US)

(72) Inventors: Bradley Bomar Hammel, Waltham, MA (US); Charles F. Huber, Waltham, MA (US)

(73) Assignee: Raytheon Company, Waltham, MA (US)

( * ) Notice: Subject to any disclaimer, the term of this patent is extended or adjusted under 35 U.S.C. 154(b) by 501 days.

(21) Appl. No.: 14/034,312

(22) Filed: Sep. 23, 2013

(65) Prior Publication Data

US 2015/0370752 A1 Dec. 24, 2015

(51) Int. Cl.
G06F 13/14 (2006.01)
G06F 13/42 (2006.01)

(52) U.S. Cl.
CPC .............................. G06F 13/4282 (2013.01)

(58) Field of Classification Search
CPC ................................................. G06F 13/4282
USPC .......... 710/52, 105, 305, 310, 315; 370/467; 701/2, 3
See application file for complete search history.

(56) References Cited

U.S. PATENT DOCUMENTS

| | | | |
|---|---|---|---|
| 5,229,538 A | 7/1993 | McGlynn | |
| 6,122,569 A * | 9/2000 | Ebert et al. | 701/3 |
| 6,212,224 B1 | 4/2001 | Cammarota et al. | |
| 6,535,522 B1 * | 3/2003 | Arato et al. | 370/466 |
| 6,615,116 B2 * | 9/2003 | Ebert et al. | 701/3 |
| 6,831,926 B1 * | 12/2004 | Kinstler | 370/467 |
| 6,941,850 B1 | 9/2005 | McMahon | |
| 7,136,393 B2 | 11/2006 | Owens | |
| 7,453,904 B2 * | 11/2008 | Seto | 370/466 |
| 7,802,048 B2 | 9/2010 | Campbell | |
| 8,516,938 B2 | 8/2013 | Roemerman et al. | |
| 2003/0018840 A1 | 1/2003 | Chandler | |
| 2003/0033059 A1 | 2/2003 | Ebert et al. | |
| 2004/0205285 A1 * | 10/2004 | Kinstler | 710/315 |
| 2005/0183570 A1 * | 8/2005 | McMahon | 89/1.811 |
| 2010/0070674 A1 * | 3/2010 | Campbell | 710/315 |
| 2010/0217899 A1 | 8/2010 | Sitzmann et al. | |
| 2012/0150365 A1 * | 6/2012 | Maxwell et al. | 701/3 |

(Continued)

OTHER PUBLICATIONS

Aircraft, Launcher & Weapon Interoperability Common Interfaces, North Atlantic Treaty Organization, Jan. 2007.*

(Continued)

*Primary Examiner* — Paul R Myers

(57) ABSTRACT

A Universal Armament Interface (UAI) translator for a legacy military standard-1760 (MIL-STD-1760) messaging interface can include a legacy interface, a UAI, and a processor. The legacy interface can transmit a legacy receive message ('R' message) and receive a legacy transmit message ('T' message). The legacy interface can include a MIL-STD-1760 remote terminal (RT) messaging interface. The UAI can receive a UAI 'R' message and transmit a UAI 'T' message. The processor can translate the legacy 'R' message to the UAI 'R' message, and translate the UAI 'T' message to the legacy 'T' message.

17 Claims, 9 Drawing Sheets

(56) References Cited

U.S. PATENT DOCUMENTS

2013/0218372 A1 8/2013 Wolfanger et al.
2015/0089099 A1 3/2015 Huber

OTHER PUBLICATIONS

Advanced UAI Integration Tools for Air to Ground Weapon Integration, SAE International, Oct. 22, 2012.*
Lockheed Martin Completes JASSM F-15E Integration with Successful All-Up Round Flight Test, Jan. 26, 2012.*
MIL-STD-1553, <https://en.wikipedia.org/wiki/MIL-STD-1553>, accessed Mar. 4, 2016.*
MIL-STD-1760, <https://en.wikipedia.org/wiki/MIL-STD-1760>, accessed Mar. 4, 2016.*
Department of Defence Interface Standard for Aircraft/Store Electrical Interconnection System MIL-STD-1760D Aug. 1, 2003.*
MIL-STD-1760 from Wikipedia Sep. 10, 2012.*
Cobham, "Small Diameter Bomb Carriage System", BRU-61/A, 2009, pp. 2, 900-071-0209, Carleton Technologies Inc, Orchard Park, New York.
DOT&E, "Joint Direct Attack Munition (JDAM)", Annual Report, 1999, 4 pages.
FAS, "AAGM-154A Joint Standoff Weapon (JSOW)", http://www.fas.org/man/dod-101/svs/smart/agm-154.htm, Jun. 2000, 3 pages.
Gregory, "Aircraft, Launcher and Weapon Interoperability Common Interfaces", North Atlantic Treaty Organization, Jan. 2007, 37 pages.
Huber et al, "Advanced UAI Integration Tools for Air to Ground Weapon Integration", SAE International, Paper No. 2012-01-2136, Oct. 2012, 3 pages.
Kopp, "Texas Instruments (Raytheon) AGM-88 HARM", Air Power International, Dec. 1998, vol. 4, No. 1, 19 pages.
Lockheed Martin, "Lockheed Martin Completes JASSM F-15E Integration with Successful All-Up Round Flight Test", Jul. 2012, 2 pages, Orlando, Florida.
Raytheon, "Paveway: Laser and GPS/Laser Precision Guided bombs", 2006, 2 pages.
Wikipedia, "MIL-STD-1553", http://en.wikipedia.org/wiki/MIL-STD-1553, as accessed on Mar. 4, 2016, 8 pages.
Wikipedia, "MIL-STD-1760", http://en.wikipedia.org/wiki/MIL-STD-1760, as accessed on Mar. 4, 2016, 4 pages.
U.S. Appl. No. 14/034,294, filed Sep. 23, 2013, Raytheon Company.
U.S. Appl. No. 14/034,347, filed Sep. 23, 2013, Raytheon Company.
AN-6140, High Speed 10 Mb/sec Buses Derived from MIL-STD-1553, Holt Integrated Circuits, Inc., Aug. 2013.
MIL-STD-1553 Today and Into the Future, Nov. 13, 2008, Data Device Corporation.

* cited by examiner

Legacy 17R Message 410

MESSAGE NAME: Modify Target

| MESSAGE ID: | 17R/T | TRANSFER TYPE: | BC-RT/RT-BC |
|---|---|---|---|
| SOURCE: | A/C/Store | WORD COUNT: | 30 |
| DESTINATION: | Store/A/C | XMIT RATE: | Aperiodic |

WORD NAME | WORD NO. | DESCRIPTION

- Command Word — CW - Subaddress 10001 binary
- Status Word — SW - MIL-STD-1553 Status Word - Transmit
- Header — 01 - Message Descriptor
- Invalidity — 02 - Validity of Message
- Target ID — 03 - Target numeric identifier
- Target Type — 04 - Target Hardness and Orientation
- Name 1/2 — 05 - Target Name Characters 1 & 2
- Name 3/4 — 06 - Target Name Characters 3 & 4
- Name 5/6 — 07 - Target Name Characters 5 & 6
- Name 7/8 — 08 - Target Name Characters 7 & 8
- Name 9/10 — 09 - Target Name Characters 9 & 10
- Name 11/12 — 10 - Target Name Characters 11 & 12
- Name 13/14 — 11 - Target Name Characters 13 & 14
- Name 15/16 — 12 - Target Name Characters 15 & 16
- Latitude — 13 - Geodetic Latitude of Target (MSW)
- — 14 - Geodetic Latitude of Target (LSW)
- Longitude — 15 - Geodetic Longitude of Target (MSW)
- — 16 - Geodetic Longitude of Target (LSW)
- Altitude — 17 - Target Altitude (MSW)
- — 18 - Target Altitude (LSW)
- Min Impact Velocity — 19 - Minimum Impact Velocity
- Impact Azimuth — 20 - Impact Azimuth
- Impact Angle — 21 - Impact Angle
- Tgt Vel North — 22 - Target Velocity North
- Tgt Vel East — 23 - Target Velocity East
- PRF Code — 24 - PRF Code
- Mode Control — 25 - Mode Control
- Offset North — 26 - North displacement of target offset
- Offset East — 27 - East displacement of target offset
- Offset Down — 28 - Down displacement of target offset
- Enhanced GPS SV#1 — 29 - Satellite ID for Enhanced GPS Handoff
- Enhanced GPS SV#2 — 30 - Satellite ID for Enhanced GPS Handoff
- Status Word — SW - MIL-STD-1553 Status Word - Receive

REMARKS/NOTES:
1. This message is used for non-mass data transfer download/upload of targeting data.

UAI 17R-1 Message 420

MESSAGE NAME: Modify Message: Target

| MESSAGE ID: | 17R/T-1 | TRANSFER TYPE: | BC-RT/RT-BC |
|---|---|---|---|
| SOURCE: | Platform/Store | WORD COUNT: | 30 |
| DESTINATION: | Store/Platform | XMIT RATE: | Aperiodic |

WORD NAME | WORD NO. | DESCRIPTION

- Command Word — CW — Subaddress 10001 (B)
- Status Word (Transmit) — SW — MIL-STD-1553 Status Word
- ...
- Latitude (MSW) — 05 — Latitude of Target
- Latitude (LSW) — 06 — Latitude of Target
- Longitude (MSW) — 07 — Longitude of Target
- Longitude (LSW) — 08 — Longitude of Target
- Altitude (MSW) — 09 — Altitude of Target
- Altitude (LSW) — 10 — Altitude of Target
- ...

UAI 24R Message 422

MESSAGE NAME: Seeker/Sensor Control

| MESSAGE ID: | 24R | TRANSFER TYPE: | BC-RT |
|---|---|---|---|
| SOURCE: | Platform | WORD COUNT: | 30 |
| DESTINATION: | Store | XMIT RATE: | Approximate to 32 Hz |

WORD NAME | WORD NO. | DESCRIPTION

- Command Word — CW — Subaddress 11000 (B)
- Header — 01 — Message Descriptor
- ...
- Laser Control — 12 — Laser Control Word
- Laser Code — 13 — Laser Code Word
- ...

FIG. 6

TRANSLATION OF UNIVERSAL ARMAMENT INTERFACE (UAI) TO MILITARY STANDARD (MIL-STD-1760) MESSAGING INTERFACE

RELATED APPLICATIONS

This application is related to and hereby incorporates by reference co-pending U.S. patent application Ser. No. 14/034,294, entitled "MILITARY STANDARD (MIL-STD-1760) INTERFACE BRIDGE", filed Sep. 23, 2013. This application is related to of and hereby incorporates by reference co-pending U.S. patent application Ser. No. 14/034,347, entitled "INTERFACE BRIDGE FOR INITIALIZING A WEAPON WITH MISSION PLANNING DATA", filed Sep. 23, 2013.

BACKGROUND

Aerial vehicles, such as attack aircraft or fighter aircraft (e.g., Boeing or McDonnell Douglas F/A-18 C/D/E/F Hornet or Lockheed Martin or General Dynamics F-16 Fighting Falcon) or unmanned aerial vehicle (UAV) (e.g., General Atomics MQ-1 Predator or MQ-9 Reaper (Predator-B)) can carry various munitions (e.g., bombs or missiles). The munitions can be carried on carriage racks (e.g., a single carriage or a dual carriage), such as a bomb release unit (BRU) (e.g., Boeing BRU-61/A). Furthermore, aerial vehicles can use a messaging protocol (e.g., military standard-1760 (MIL-STD-1760)) to control, monitor, and release the munitions on the carriage racks.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 6 illustrates a diagram of legacy 17R (i.e., target data) message fields mapping to Universal Armament Interface (UAI) 17R (i.e., target data) and UAI 24R (i.e., seeker control) messages in accordance with an example;

Figure 1:
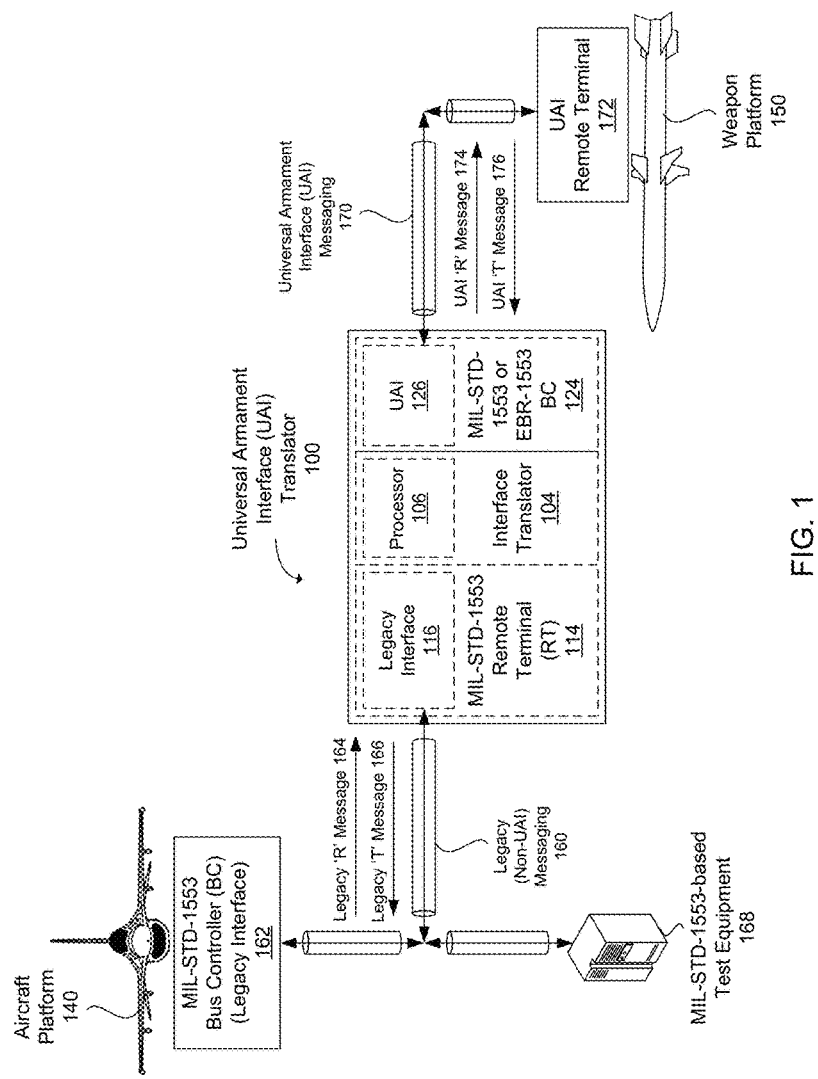
FIG. 1 illustrates a functional diagram of an Universal Armament Interface (UAI) translator including a legacy military standard-1760 (MIL-STD-1760) messaging interface used between an aircraft platform and a weapon platform in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Modern air-to-ground weapons may implement a Universal Armament Interface (UAI). The UAI can be logical or messaging interface allowing for a standardized message structure for various modern weapons and aircraft platforms. Many aircraft platforms (e.g., using military standard-1760 (MIL-STD-1760) precision guided munitions (PGM) mission store) that do not implement the UAI can still be candidates to carry UAI weapons. The effort (e.g., cost and development) to implement a UAI capability into the platform avionics can require significant platform avionics software upgrades and/or modifications to the weapon's software.

A Universal Armament Interface (UAI) translator 100 can provide real-time logical or messaging translation between the MIL-STD-1760 PGM message interface (i.e., legacy interface 116) and the UAI 126, as illustrated in FIG. 1. The UAI translator can be placed anywhere in a path (i.e., inline) between a legacy interface (e.g., MIL-STD-1553 bus controller (BC) 162) of an aircraft platform 140 and a UAI (e.g., UAI remote terminal (RT) 172) of a weapon platform 150. For instance, the UAI translator can be incorporated with controls of the aircraft platform (e.g., in a cockpit) or located with a carriage rack. In an example, the UAI translator can be incorporated in a MIL-STD-1760 interface bridge as described in co-pending U.S. patent application Ser. No. 14/034,294, entitled "MILITARY STANDARD (MIL-STD-1760) INTERFACE BRIDGE", filed Sep. 23, 2013, which is hereby incorporated by reference in its entirety. The UAI translator can provide real-time message translation, data conversion, and data field manipulation so the message protocols can be understood between the aircraft and the weapon.

The UAI translator 100 can include a MIL-STD-1553 remote terminal (RT) 114 as an interface on the aircraft platform side, a MIL-STD-1553 bus controller (BC) or Enhanced Bit Rate-1553 (EBR-1553) BC 124 as an interface on the weapon platform side, and an interface translator 104 to provide message translation (or logical translation or data manipulation) between the legacy interface and the UAI. The interface translator can include a processor 106 (e.g., central processing unit (CPU)) to provide message translation (conversion) in real-time while maintain critical timing requirements.

Miniature munitions (e.g. small diameter bomb-I (SDB-I) and SDB-II) can use the UAI (i.e., using UAI messaging 170), which can be incompatible with a MIL-STD-1760 and/or a MIL-STD-1553B aircraft message interface (i.e., using legacy (non-UAI) messaging 160) used by legacy aircraft platforms. These small munitions can mount to a multi-position carriage system, which can provide carriage and/or ejection. The UAI translator can eliminate a need for an expensive carriage or aircraft store or modifications to an aircraft platform messaging interface. Thus, the UAI translator can significantly reduce integration costs for miniature munitions using the UAI, and allows carriage of miniature munitions on any MIL-STD-1760 platform with 14" lugs (i.e., mounts for munitions).

An aircraft store can include any device intended for internal or external carriage and mounted on aircraft suspension and release equipment, whether or not the item is intended to be separated inflight from the aircraft. Aircraft stores can be classified in two categories: an expendable store and a nonexpendable store. The expendable store may normally be separated from the aircraft in flight such as a missile, rocket, bomb, nuclear weapon, mine, torpedo, pyrotechnic device, sonobuoy, signal underwater sound device, or other similar items. The nonexpendable store may not normally be separated from the aircraft in flight such as a tank (e.g., fuel and spray), line-source disseminator, pod (e.g., refueling, thrust augmentation, gun, electronic attack, data link), multiple rack, target, cargo drop container, drone or other similar items.

Figure 2:
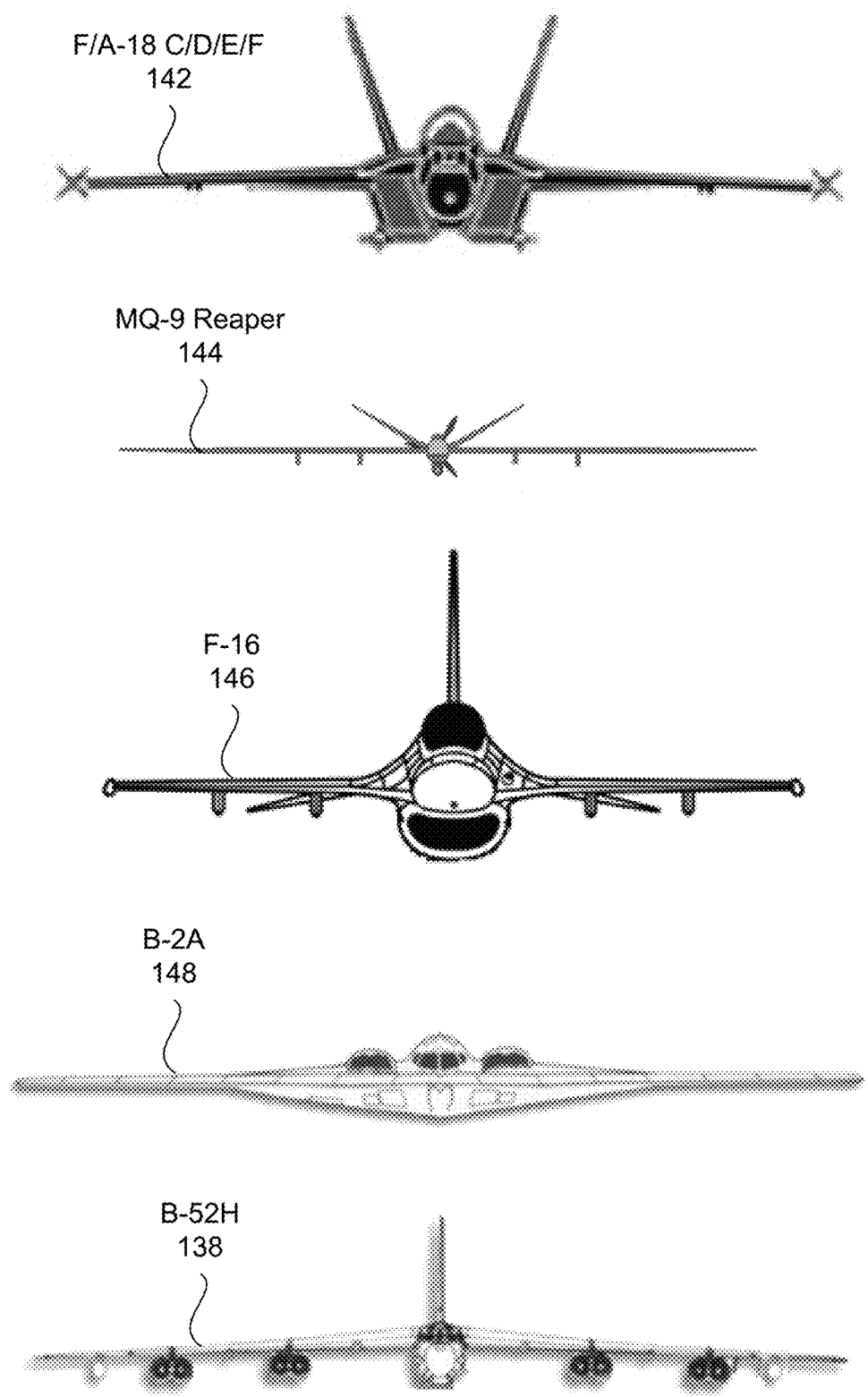
FIG. 2 illustrates a diagram of aircraft platforms in accordance with an example.

FIG. 2 illustrates aerial vehicles, such as attack aircraft or fighter aircraft (e.g., Boeing or McDonnell Douglas F/A-18 C/D/E/F Hornet 142, Lockheed Martin or General Dynamics F-16 Fighting Falcon 146, Northrop Grumman B-2A 148 (i.e., Stealth Bomber), or Boeing B-52H Stratofortress 138) or unmanned aerial vehicle (UAV) (e.g., General Atomics MQ-1 Predator or MQ-9 Reaper 144 (Predator-B)) which can be aircraft platforms for the UAI translator.

The carriage platforms that can operate with the UAI translator can include the bomb release unit-55 (BRU-55) (used by the U.S. Department of the Navy (DoN)) and allows carriage of two smart weapons (e.g., dual weapon up to 1000 lb class) on a single aircraft platform), BRU-33 (dual weapon carriage used by the U.S. Marines), BRU-57 (dual weapon carriage used by the U.S. Air Force (USAF)), munitions armament unit-46 (MAU-46), BRU-71/A, smart bomb rack assembly (SBRA) (including 20 weapons), or heavy stores adapter beam (HSAB) (including 9 weapons for external munitions on USAF B-52H).

The legacy interface can use a message format for an MIL-STD-1760 precision guided munitions (PGM) mission store. The MIL-STD-1760 precision guided munitions mission store include Guided Bomb Unit-31/32/38 (GBU-31/32/38) Joint Direct Attack Munitions (JDAM); Air-to-Ground Missile-154 (AGM-154) Joint Standoff Weapon (JSOW); Enhanced GBU-24/27/28 (EGBU-24/27/28) Enhanced Paveway™; Cluster Bomb Unit-103 (CBU-103), CBU-104, or CBU-105 Wind Corrected Munitions Dispensers (WCMDs); Air-launched Decoy Missile-160B/C (ADM-160B/C) Miniature Air Launched Decoy (MALD); or AGM-158 Joint Air-to-Surface Stand-Off Missile (JASSM). The message format (i.e., legacy (non-UAI) format) for an MIL-STD-1760 PGM mission store can use message structures and definitions conforming to a legacy weapon Interface Control Document (ICD).

The following provides greater details of the examples. Referring back to FIG. 1, The UAI translator 100 can provide real-time, inline translation of a legacy interface to a UAI. The UAI translator can include capabilities to support multiple different aircraft interfaces and platforms. The aircraft platform can include a MIL-STD-1553 (or MIL-STD-1760) bus controller (BC) 162 for sending messages (e.g., legacy receive ('R') messages 164) to the weapon and receiving messages (e.g., legacy transmit ('T') messages 166) from the weapon via a legacy (non-UAI) messaging 160. The weapon platform can use an UAI remote terminal (RT) 172 for sending messages (e.g., UAI transmit ('T') messages 176) to the aircraft and receiving messages (e.g., UAI receive ('R') messages 174) from the aircraft and via UAI messaging 170. The UAI translator can operate as a MIL-STD-1760 (e.g., MIL-STD-1553) RT 114 for the aircraft platform, operate as a MIL-STD-1553 or an EBR-1553 BC 124 for the weapon platform, and provide an interface translator 104 for providing message layer translation (or logical layer translation) between the legacy interface and the UAI. The UAI translator can convert the legacy 'R' message interface on the RT side to the UAI 'R' message interface on the BC side. The UAI translator can also convert the 'T' UAI message interface on the BC side to the legacy 'T' message interface on the RT side.

In another example, the MIL-STD-1553 RT 114 can be coupled to MIL-STD-1553-based test equipment 168 to simulate the aircraft platform's BC and verify the interface translator and the legacy interface RT functionality. In another configuration (not shown), the MIL-STD-1553 or EBR-1553 BC 124 can be coupled to MIL-STD-1553-based or EBR-1553-based test equipment to simulate the weapon platform's RT and verify the interface translator and the UAI BC functionality.

The interface translator 100 allows a UAI weapon (e.g., SDB-II) to be integrated onto a platform that implements a legacy MIL-STD-1760 messaging interface for an air-to-ground weapon (e.g., JDAM or Enhanced Paveway™) and provides a logical interface (i.e., 'T' and 'R' messages) between the UAI weapon and legacy aircraft platform. The interface translator can be implemented in software, firmware, or hardware and can run on the processor 106 to shift and/or recalculate data elements to perform the interface translation. If the message is reformatted then the processor can perform remapping of the UAI 'T' message before updating the legacy 'T' message buffer on the RT (aircraft side). The interface translation may be platform specific, which may differ slightly depending on the platform. The UAI translator can adjust to a specific platform based on a received aircraft identifier (ID) message (e.g., subaddress [01 R] message). The MIL-STD-1760 interface provides for the definition of the aircraft ID message.

MIL-STD-1760 defines some standard messages and interface protocols. However, a significant portion of the message formats can be unique to the particular weapon. The Universal Armament Interface (UAI) specifications delineate standard message structures for message subaddresses. The platform and/or weapon has the capability to customize or tailor portions of the interface based on supported functionality. Without changing the UAI specification, neither the platform nor the store (e.g., aircraft store) may define new message formats or fields within a message.

Thus, the UAI specification can be a common interface that can simplify the integration of the various platform and/or store interface combinations.

As established weapons implement the UAI, these weapons may continue to support their legacy interface so that these weapons can continue to work on platforms that have not implemented UAI. A weapon system (e.g., SDB-II) may be designed as a UAI weapon without a legacy interface. The cost for existing platforms to implement UAI can be expensive. Additionally, a weapon, such as SDB-II, can use advanced UAI features that previously integrated weapons did not use, which advanced features may not be supported in the platform avionics. The technology (e.g., UAI translator, methods, computer circuitry, and systems) described herein can provide mechanisms to implement a UAI weapon (e.g., SDB-II) on a legacy MIL-STD-1760 platform without requiring major changes to the aircraft avionics software and without requiring the platform to implement UAI capability.

In computer networking and/or wired communication, different functions can be provided by different layers in a protocol stack. The protocol stack can be an implementation of a computer networking protocol suite. The protocol stack (or protocol suite or standard) can include the definition and implementation of the protocols. Each layer or protocol in the protocol stack can provide a specified function. The modularization of the layers and protocols can make design and evaluation of the computer networking and/or wired communication easier. In an example, each protocol module or layer module in a stack of protocols may communicate with at least two other modules (e.g., a higher layer and a lower layer). The lowest protocol or layer (e.g., physical layer) can provide low-level, physical interaction with the hardware. Each higher layer may add more features. The upper or topmost layers (e.g., application layer) can include user applications.

In an example of aircraft-to-weapon system communication, at least three communication layers can be used, including the physical layer, a message layer, and the application layer. The UAI translator can provide message layer (i.e., logical layer) processing of messages between the aircraft platform and a weapon (e.g., miniature munition).

Prior to the MIL-STD-1553 data bus (i.e., a serial digital multiplex data bus), aircraft platforms and weapons used inefficient and cumbersome analog point-to-point wire bundles as a means of interconnecting the sensors, computers, actuators, indicators, and other equipment onboard the modern military vehicle. The MIL-STD-1553 multiplex data bus can provide integrated, centralized system control and a standard interface for equipment connected to the bus. The MIL-STD-1553 bus (or interface) provides a means by which bus traffic is available to be accessed with a single connection for testing and interfacing with the system. The MIL-STD-1553 (e.g., "Aircraft Internal Time-Division Command/Response Multiplex Data Bus") with the appropriate revision letter (A or B) as a suffix defines operation of a serial data bus that interconnects multiple devices via a twisted, shielded pair of wires. A MIL-STD-1553 system can implement a command-response format. Multiplexing provides weight reduction, simplicity, standardization, and flexibility. Multiplexing facilitates the transmission of information along the data flow, and permits the transmission of several signal sources through one communications system.

A MIL-STD-1553 multiplex data bus system can include a bus controller (BC) controlling multiple remote terminals (RT) connected together by a data bus providing a single data path between the bus controller and the associated remote terminals. One or more bus monitors (BM) may be coupled to the MIL-STD-1553 bus, however, bus monitors may not take part in data transfers, and can be used to capture or record data for analysis. In redundant bus implementations, several data buses are used to provide more than one data path (i.e., dual redundant data bus or tri-redundant data bus). Transmissions onto the data bus can be accessible to the BC and connected RTs.

The MIL-STD-1553 bus is made up of twisted-shielded pairs of wires to maintain message integrity with a redundant pair of buses for a second path (or additional paths) for bus traffic in case one of the buses is damaged. Three functional modes of terminals can be used on the data bus: the bus controller, the bus monitor, and the remote terminal. Devices may be capable of more than one function.

The MIL-STD-1553 bus controller (BC) can be a terminal that initiates information transfers on the data bus. The MIL-STD-1553 can send commands to the remote terminals (RT), which can reply with a response. The MIL-STD-1553 bus can support multiple controllers, but only one BC may be active at a time. The control of information transmission on the bus resides with the bus controller. The MIL-STD-1553 bus monitor (BM), which can be used for instrumentation, can be a terminal assigned the task of receiving bus traffic and extracting selected information to be used at a later time. The MIL-STD-1553 remote terminal can be any terminal operating in the remote terminal (RT) mode (e.g., not operating in either the bus controller or bus monitor mode).

Figure 3:
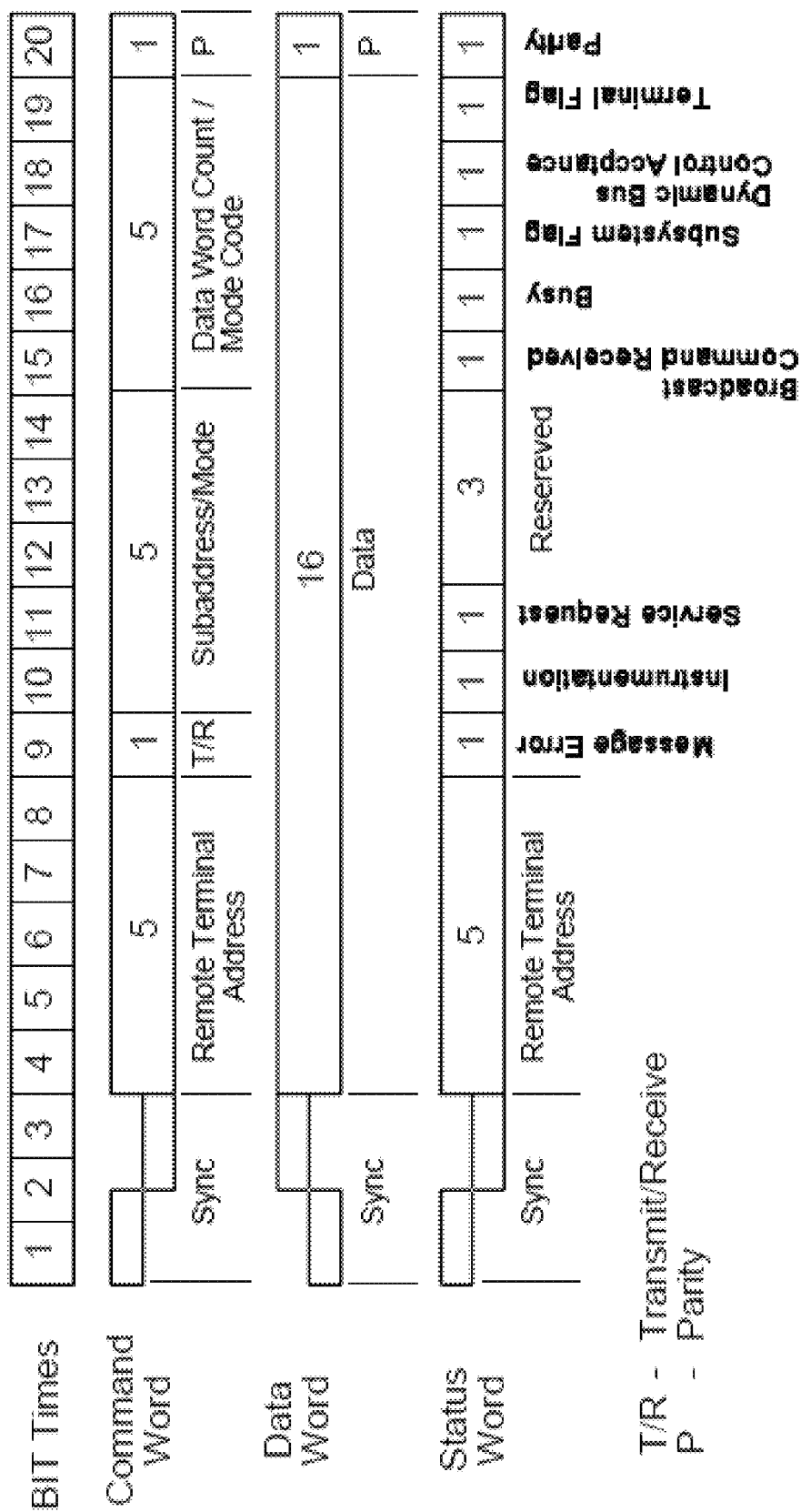
FIG. 3 illustrates a diagram of military standard-1553 (MIL-STD-1553) word formats in accordance with an example.

As illustrates in FIG. 3, messages consist of one or more 16-bit words (e.g., command, data, or status). The 16 bits comprising each word can be transmitted using Manchester code, where each bit is transmitted as a 0.5 μs high and 0.5 μs low for a logical 1 or a low-high sequence for a logical 0. Each word can be preceded by a 3 μs synchronization (sync) pulse (i.e., 1.5 μs low plus 1.5 μs high for data words and the opposite for command and status words, which cannot occur in the Manchester code) and followed by an odd parity bit. Practically each word can be considered as a 20-bit word: 3 bit for sync, 16 bit for payload and 1 bit for odd parity control. The words within a message can transmitted contiguously and a minimum of a 4 microsecond (μs) gap can occur between messages. However, an inter-message gap can be much larger than 4 μs, even up to 1 ms with some older bus controllers. Devices (e.g., RTs) can start transmitting their response to a valid command within 4-12 μs and may considered to not have received a command or message if no response has started within 14 μs.

The nominal word size is 16 bits, with the most significant bit (MSB) first. The three types or formats of MIL-STD-1553 words include a command word, a status word, and a data word, as illustrated by FIG. 3. A packet is defined to have no inter-message gaps. The time between the last word of a controller message and the return (i.e., reply) of the terminal status byte is 4-12 microseconds. The time between status byte and a next bus controller message may be undefined.

Command words are transmitted by the bus controller and include a 3 bit-time sync pattern (i.e., bits 1-3), a 5 bit RT address field (i.e., bits 4-8; RT address 0-31), a 1 transmit/receive (T/R) field (i.e., bit 9; 0 for receive or 1 for transmit), a 5 bit subaddress/mode field (i.e., bits 10-14; indicate the location (sub-address) to hold or get data on the RT (1-30); sub-addresses 0 and 31 are reserved for mode codes), a 5 bit word count/mode code field (i.e., bits 15-19; indicate the number of words to expect (1-32); all zero bits indicate 32 words), and a 1 parity check bit (i.e., bit 20). In the case of a mode code, these bits indicate the mode code number (e.g., initiate self-test and transmit BIT word).

Data words can be transmitted either by the BC or by the RT in response to a BC request. MIL-STD-1553 allows a maximum of 32 data words to be sent in a packet with a command word before a status response is returned. Data words can include a 3 bit-time sync pattern (i.e., bits 1-3; opposite in polarity from command and status words), a 16 bit data field (i.e., bits 4-20), and 1 parity check bit (i.e., bit 20). The status words can be transmitted by the RT in response to command messages from the BC and include a 3 bit-time sync pattern (i.e., a similar pattern as for a command word), a 5 bit address of the responding RT (i.e., bits 4-8; RT address 0-31), a 11 bit status field to notify the BC of the operating condition of the RT and subsystem (i.e., bits 9-19; single bit condition codes, where 'one' state indicates a condition is true; more than one condition may be true at the same time), and 1 parity check bit (i.e., bit 20).

Communication on the MIL-STD-1553 bus can be under the control of the bus controller using commands from the BC to the RTs to receive or transmit. The sequence of words, (the form of the notation can be <originator>.<word_type (destination)> and is a notation similar to communicating sequential processes (CSP)), for transfer of data from the BC (e.g., master) to a terminal (e.g., RT) can be represented by: master.command(terminal)→terminal.status(master)→master.data(terminal)→master.command(terminal)→terminal.status(master)

Thus, during a transfer, communication is started by the bus controller, and a remote terminal device may not initiate a data transfer. The status word at the end of a data transfer sequence ensures that the data has been received and that the result of the data transfer is acceptable. If either RT fails to send its status or the expected data or indicates a problem through the setting of error bits in the status word, the bus controller may retry the transmission. Thus the MIL-STD-1553 sequence of words provides high integrity communication.

The MIL-STD-1553 bus controller can have a schedule of transfers (referred to as cyclic executive schedule structure) that covers the majority of transfers, often organized into a major frame or major cycle, which can be subdivided into minor cycles. The scheduled of transfers can be referred to as periodic messages. While the RTs may not start a transfer directly, the MIL-STD-1553 does provide processes (e.g., acyclic transfers as they are outside the structure used by the cyclic executive) for when an RT needs to transmit data that is not automatically scheduled by the bus controller. Due to acyclic transfers, the bus controller can poll the remote terminals connected to the data bus, generally at least once in a major cycle. RTs with higher-priority functions (for example, RTs operating the aircraft control surfaces) can be polled more frequently, while lower-priority functions may be polled less frequently.

Six types of MIL-STD-1553 transactions can be allowed between the BC and a specific RT or between the bus controller and a pair of RTs. The six types of MIL-STD-1553 transactions can include a controller to RT transfer, a RT to controller transfer, RT to RT transfers, a mode command without a data word, a transmit mode command with data word(s), or a receive mode command with data word(s). In the controller to RT transfer, the bus controller sends one 16-bit receive command word, immediately followed by 1 to 32 16-bit data words. The selected remote terminal can then send a single 16-bit status word. In the RT to controller transfer, the bus controller sends one transmit command word to a remote terminal. The remote terminal then sends a single status word, immediately followed by 1 to 32 words. In the RT to RT transfers, the bus controller sends out one receive command word immediately followed by one transmit command word. The transmitting remote terminal sends a status word immediately followed by 1 to 32 data words. The receiving terminal then sends its status word. In the mode command without a data word, the bus controller sends one command word with a subaddress of 0 or 31 signifying a mode code type command. The remote terminal responds with a status word. In the transmit mode command with data word(s), the bus controller sends one command word with a subaddress of 0 or 31 signifying a mode code type command. The remote terminal responds with a status word immediately followed by a data word. In a receive mode command with data word(s), the bus controller sends one command word with a subaddress of 0 or 31 signifying a mode code type command immediately followed by a data word. The remote terminal responds with a status word. MIL-STD-1553B also allows for additional optional broadcast transfers, such as the controller to RT(s) transfer, the RT to RT(s) transfers, the broadcast type mode command without a data word, and the broadcast type mode command with data word(s).

Figure 4:
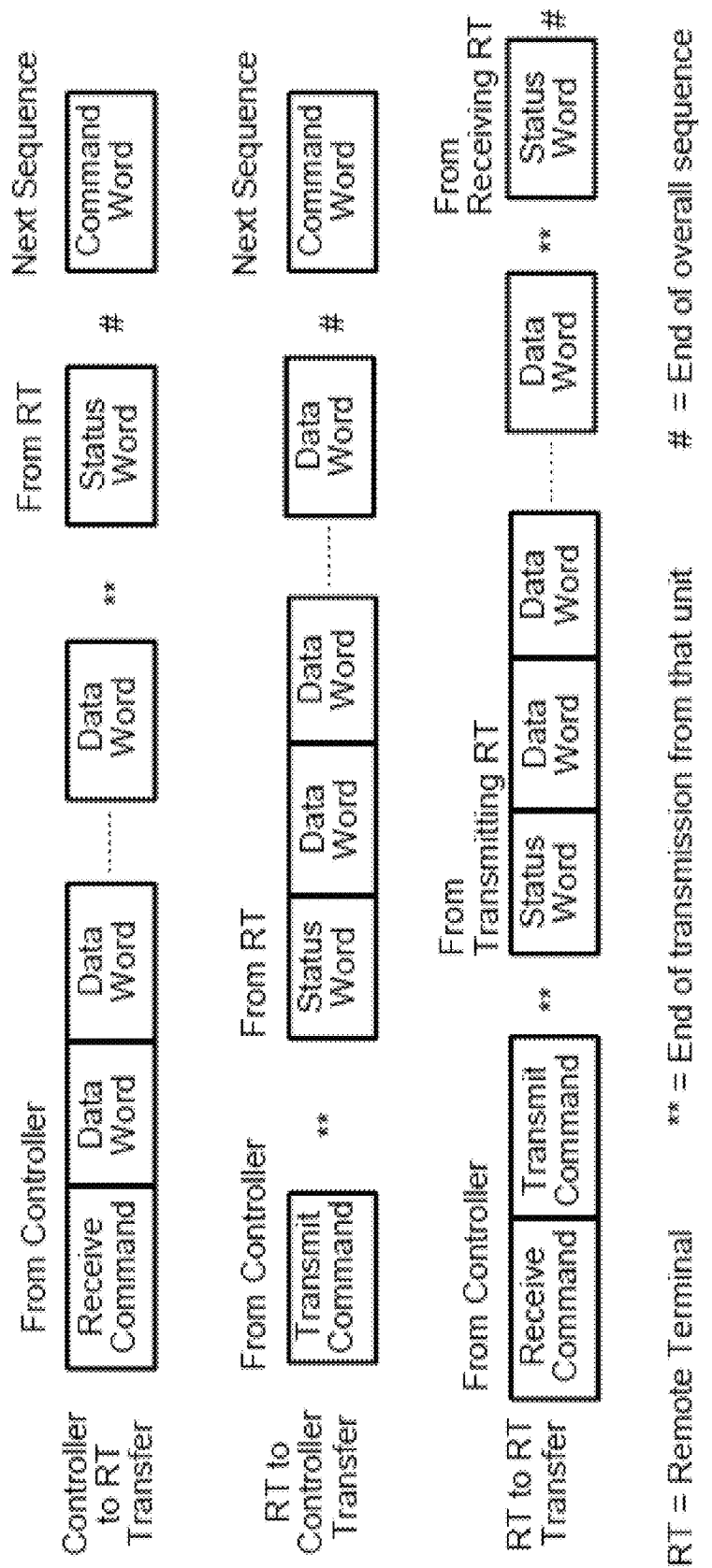
FIG. 4 illustrates a diagram of military standard-1553 (MIL-STD-1553) data message formats in accordance with an example.

FIG. 4 illustrates the basic formats of three basic types of MIL-STD-1553 information transfers including bus controller to remote terminal transfers (BC-to-RT), remote terminal to bus controller transfers (RT-to-BC), and remote terminal to remote terminal (RT-to-RT) transfers. The RT-to-RT transfer may not apply to MIL-STD-1760 weapon systems. The MIL-STD-1553 information transfers can be related to the data flow and can be referred to as messages. In an example, receive ('R') messages can refer to BC-to-RT messages, and transmit ('T') messages can refer to RT-to-BC messages.

Figure 5:
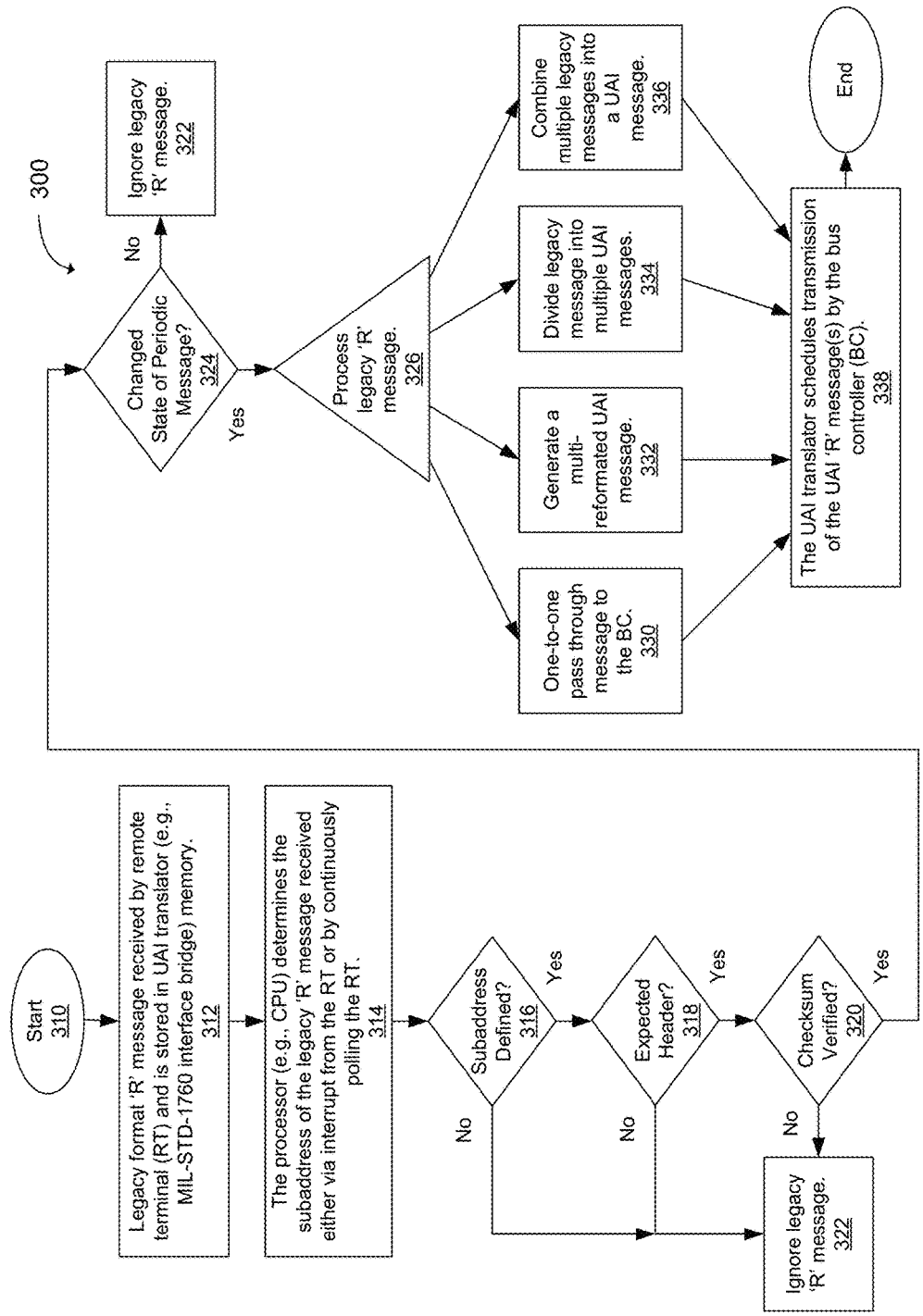
FIG. 5 illustrates a flow chart of a receive message ('R' message) process in accordance with an example.

FIG. 5 illustrates an 'R' message process flow 300 and translation using the Universal Armament Interface (UAI) translator. The flow can start 310 with a legacy format 'R' message being received by remote terminal (RT) and stored in UAI translator (e.g., MIL-STD-1760 interface bridge) memory 312. Then, the processor (e.g., CPU) can determine the subaddress of the legacy 'R' message received either via interrupt from the RT or by continuously polling the RT 314. Next, a determination of the subaddress can be made 316. If the subaddress for the legacy format 'R' message is undefined, the UAI translator can ignore the legacy format 'R' message 322. If the subaddress for the legacy format 'R' message is defined, a determination can be made if the first word of the header is expected 318. If the first word of the header is not expected, the UAI translator can ignore the legacy format 'R' message. If the first word of the header is expected, the UAI translator can verify that the checksum passes 320. The checksum check may only be performed if the full length legacy format 'R' message has been transmitted by the BC (162 of FIG. 1) from the aircraft platform. If the checksum does not pass, the UAI translator can ignore the legacy format 'R' message. If the checksum passes, a determination can be made if the legacy format 'R' message is a periodic legacy format 'R' message and if the contents of the periodic legacy format 'R' message have a changed state 324. If the legacy format 'R' message is a periodic legacy format 'R' message and the periodic legacy format 'R' message has not changed state, the UAI translator can ignore the legacy format 'R' message. For messages sent periodically, the UAI translator may only process messages that have changed state. Aperiodic (e.g., on demand messages) may be processed for each instance. If the legacy format 'R' message is an aperiodic legacy format 'R' message, or if the legacy format 'R' message is a periodic legacy format 'R' message and the periodic legacy format 'R' message has changed state, the UAI translator may process the legacy format 'R' message based on the message type 326. In an example, determining a defined subaddress, an expected first word header, a verified checksum, or a changed state of the periodic legacy 'R' message can be performed in any order. In another example, one or more of the operations of determining a defined subaddress, an expected first word header, a verified checksum, or a changed state of the periodic legacy 'R' message may be omitted.

Some types of legacy format 'R' message can have a one-to-one mapping to a UAI format 'R' message and can pass through to the BC 330 with minor to no modifications. The legacy and UAI definition for the 'R' message (msg) can be similar with some minor differences. For example, one-to-one pass though 'R' messages can include aircraft platform ID (1R), periodic transfer alignment (2R), time msg (3R) (e.g., the legacy time mark block (4R) message can be used to compute the global positioning system (GPS) leap seconds which can be a field in the UAI 3R message), moment arm (9R), store control (11R) (e.g., only the mission store control component of the message may be used by the legacy interface), GPS keys (12R), mass data transfer data (13R), mass data transfer control (14R), and environmental data (15R).

Some types of legacy format 'R' message can reformatted to multiple UAI format 'R' messages 332. The fields from multiple legacy messages may be used to populate or construct multiple UAI messages. For instance, the legacy 17R (target data) fields can be map to the UAI 17R (target data) and UAI 24R (seeker control) messages. FIG. 6 illustrates a representation of legacy 17R (i.e., target data) message fields (for Enhanced Paveway™ or JDAM interface) mapping to UAI 17R (i.e., target data) and UAI 24R (i.e., seeker control) messages, where FIG. 6 illustrates an abbreviated description of the UAI message set. For instance, the latitude, longitude, and altitude from the legacy 17R message 410 can map to the UAI 17R-1 message 420, and the PRF code and mode control from the legacy 17R message can map to the laser control and laser code of the UAI 24R message 422.

Referring back to FIG. 5, some types of legacy format 'R' message can be divided into multiple UAI format 'R' messages 334 (i.e., legacy divided 'R' message). The legacy 'R' message fields and/or commands can result in two or more instances of UAI format 'R' messages being transmitted. For instance, the legacy 22R message may update both the UAI 22R (weapon control) and UAI 6R (launch acceptability region (LAR) control) messages.

In an example, a plurality of legacy format 'R' messages can be combined into a UAI format 'R' message 336 (i.e., UAI divided 'R' message). The multiple legacy 'R' messages can be mapped to a single UAI 'R' message. For instance, the UAI 11 R message can be a dual purpose message containing both mission store control commands from the legacy 11 R message and fuze settings data from the legacy 23R message.

Although some examples of 'R' message translation of specific messages have been illustrated, other specific messages can use at least one of the four messaging processes (e.g., 330, 332, 334, or 336). After the legacy format 'R' message is translated or converted to the UAI format 'R' message (330, 332, 334, or 336), the UAI translator can schedule transmission of the UAI 'R' message(s) by the bus controller (BC) 338.

In an example, the UAI translator can receive time-stamped legacy 'R' messages from the aircraft BC and can maintain the computed data latency accuracy on retransmitting the converted time-stamped UAI 'R' messages. The time-stamped 'R' message can conform to a "data latency" method of time-stamping as specified in MIL-STD-1760. The UAI translator can recompute the timestamp using a "time tag" method of time-stamping as specified in the UAI specification. In an example, the time tag method can include initiation of a periodic transmittal of a mode code 17 (MC17) message by the BC at a rate of 0.25 to 1 hertz (Hz). Then the data in the MC17 message can be set with a dataword set equal a BC real time clock. The timestamp fields can be recomputed in the 'R' message so that the computed data latency using the mode code 17 method is accurate.

In another example, the UAI translator can receive time-stamped legacy 'R' message conforming to the "time tag" method of time-stamping as specified in MIL-STD-1760. The UAI translator can modify a time stamping of a specified mode control (MC) message, or maintain a timing requirement of a specified received legacy message ('R' message) generated via the MIL-STD-1553 RT protocol.

Figure 7:
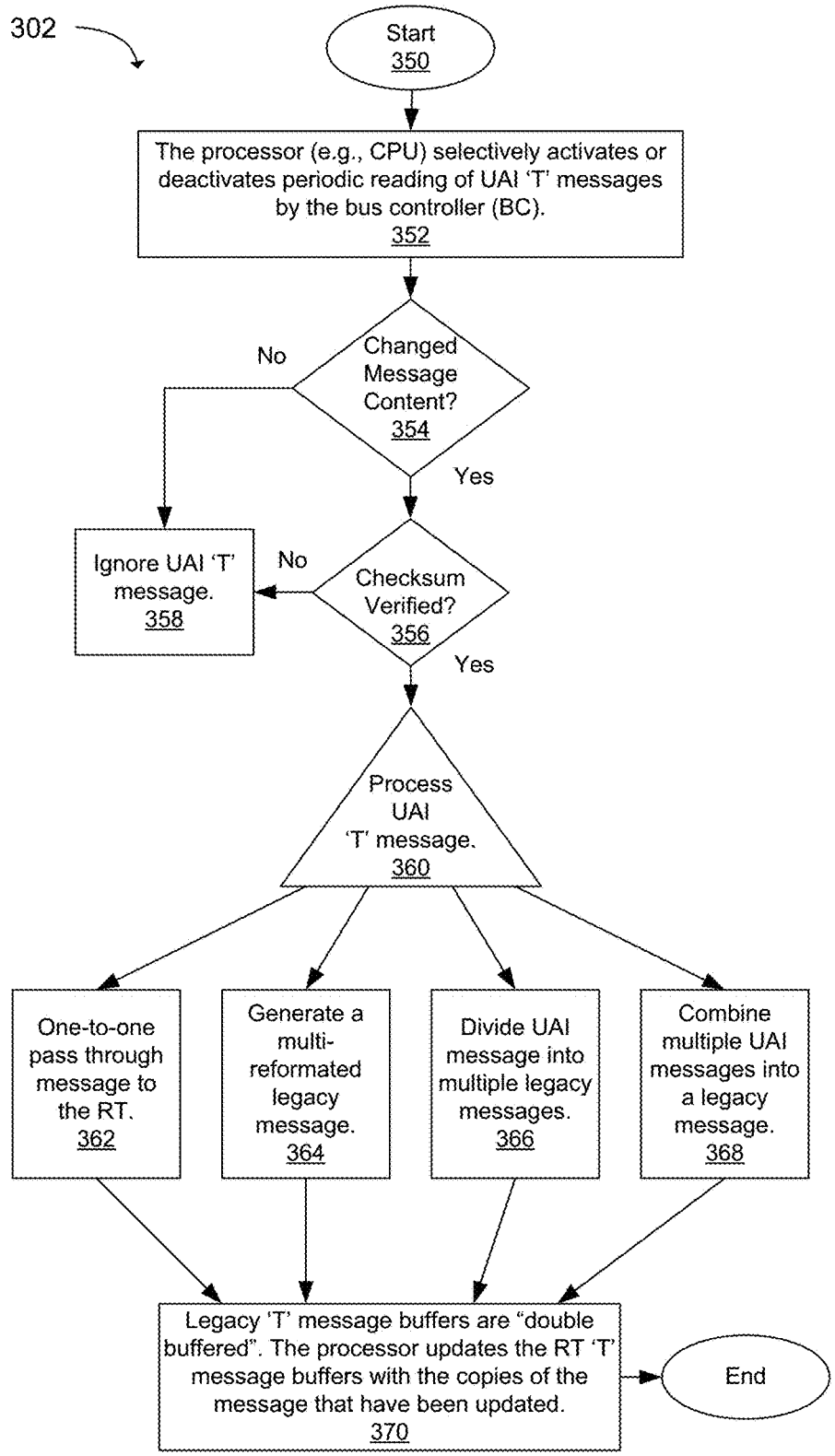
FIG. 7 illustrates a flow chart of a transmit message ('T' message) process in accordance with an example.

The UAI translator can also convert a UAI format 'T' message to a legacy format 'T' message. FIG. 7 illustrates a transmit ('T') message process flow 302 and translation using the Universal Armament Interface (UAI) translator. The flow can start 350 with the processor (e.g., CPU) selectively activating or deactivating periodic reading of UAI 'T' messages by the bus controller (BC) 352. A determination can be made if the contents of the UAI format 'T' message have a changed state 354. If the UAI format 'T' message has not changed state, the UAI translator can ignore the UAI format 'T' message 358. If the UAI format 'T' message has changed state, the UAI translator can verify that the checksum passes 356. The checksum check may only be performed if the full length UAI format 'T' message has been transmitted by the UAI RT (172 of FIG. 1) from the weapon platform. If the checksum does not pass, the UAI translator can ignore the UAI format 'T' message. If the checksum passes, the UAI translator may process the UAI format 'T' message based on the message type 360. In an example, determining a changed state of the UAI format 'T' message, or a verified checksum can be performed in any order. In another example, one or more of the operations of determining a changed state of the UAI format 'T' message or a verified checksum may be omitted.

Some types of UAI format 'T' message can have a one-to-one mapping to a legacy format 'T' message and can pass through to the RT 362 with minor to no modifications. The legacy and UAI definition for the 'T' message can be similar with some minor differences. For example, one-to-one pass though 'T' messages can include store ID (1T) or mass data transfer monitor (14T) passed through directly to the RT.

Some types of UAI format 'T' message can reformatted to multiple legacy format 'T' messages 364. The fields from multiple UAI messages may be used to populate or construct multiple legacy messages. For instance, selected fields from the UAI 22T can be used to update the legacy 22T message. In another example, the UAI launch acceptability range in zone and in range messages (5T, 6T) can be used to update the legacy 9T and 15T messages.

Some types of UAI format 'T' message can be divided into multiple legacy format 'T' messages 366 (i.e., UAI divided 'T' message). The UAI 'T' message fields and/or commands can result in two or more instances of legacy format 'T' messages being transmitted. For instance, the critical control words of the UAI 11T (mission store monitor) message can be used to update the legacy 11T buffers, and the fuze settings fields of the UAI 11T message can be used to update the legacy 23T message.

In an example, a plurality of UAI format 'T' messages can be combined into a legacy format 'T' message 368 (i.e., legacy divided 'T' message). The multiple UAI 'T' messages can be mapped to a single legacy 'T' message. For instance, the UAI 17T (target data monitor) fields and the UAI 24T (seeker monitor) fields can be used to update the legacy 17T message.

Although some examples of 'T' message translation of specific messages have been illustrated, other specific messages can use at least one of the four messaging processes (e.g., 362, 364, 366, or 368). After the UAI format 'T' message is translated or converted to the legacy format 'T' message 362, 364, 366, or 368, the legacy 'T' message buffers can be "double buffered". The processor can update the RT 'T' message buffers with the copies of the message that have been updated 370.

Referring back to FIG. 1, a Universal Armament Interface (UAI) translator 100 can include a legacy interface 116, a UAI 126, and a processor 106. The UAI translator can provide a legacy military standard-1760 (MIL-STD-1760) messaging interface. The legacy interface can be configured to receive a legacy receive message ('R' message) and transmit a legacy transmit message (7' message). The legacy interface can include a MIL-STD-1760 remote terminal (RT) messaging interface. The UAI can be configured to transmit a UAI 'R' message and receive a UAI 'T' message. The processor can be configured to translate the legacy 'R' message to the UAI 'R' message, and translate the UAI 'T' message to the legacy 'T' message.

In an example, the weapon side connector uses an aircraft store-5725 (AS-5725) connector (or joint miniature munitions interface (JMMI) connector 122 or miniature munitions store interface (MMSI) connector) and the weapon side signaling protocol uses an Enhanced Bit Rate-1553 (EBR-1553) bus controller (BC) protocol.

In another example, the UAI translator can include an 'R' message buffer, a bus controller (BC) 'T' message buffer, and a remote terminal (RT) 'T' message buffer. The 'R' message buffer can be configured to buffer the legacy 'R' message from an incoming legacy 'R' message during translation to the UAI 'R' message. The bus controller (BC) 'T' message buffer can be configured to copy the UAI 'T' message from an updated UAI 'T' message during translation to the legacy 'T' message. The remote terminal (RT) 'T' message buffer can be configured to buffer the legacy 'T' message after translation from the UAI 'T' message until the legacy 'T' message is transmitted. In another example, the legacy interface provides an aircraft-side logical interface, and the UAI provides a weapon-side logical interface.

In another configuration, the legacy 'R' message and the legacy 'T' message of the legacy interface use a message format for an MIL-STD-1760 precision guided munitions (PGM) mission store. The MIL-STD-1760 precision guided munitions mission store include Guided Bomb Unit-31/32/38 (GBU-31/32/38) Joint Direct Attack Munitions (JDAM); Air-to-Ground Missile-154 (AGM-154) Joint Standoff Weapon (JSOW); Enhanced GBU-24/27/28/49 (EGBU-24/27/28/49) Enhanced Paveway™; Cluster Bomb Unit-103 (CBU-103), CBU-104, or CBU-105 Wind Corrected Munitions Dispensers (WCMDs); Air-launched Decoy Missile-160B/C (ADM-160B/C) Miniature Air Launched Decoy (MALD); or AGM-158 Joint Air-to-Surface Stand-Off Missile (JASSM).

Figure 8:
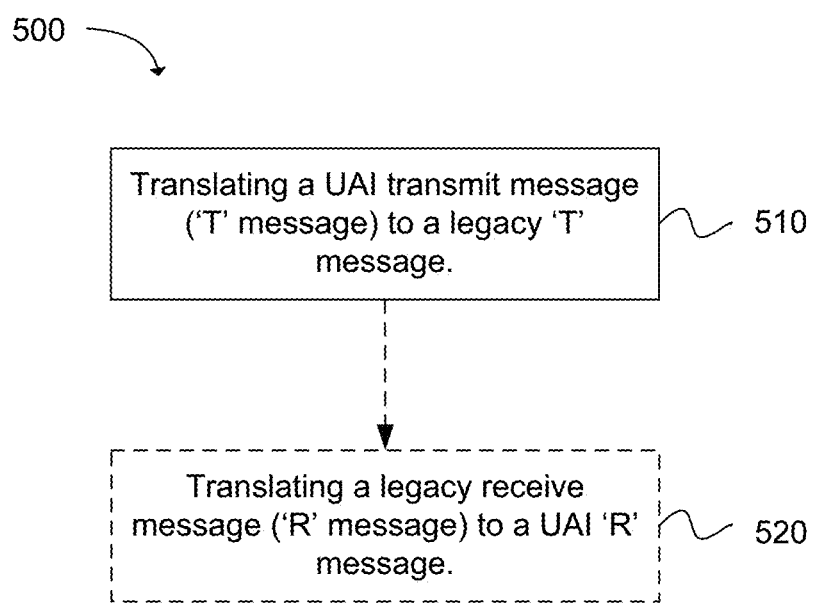
FIG. 8 depicts a flow chart of a method for translating between and Universal Armament Interface (UAI) and a military standard-1760 (MIL-STD-1760) messaging interface in accordance with an example.

Another example provides a method 500 for translating between and Universal Armament Interface (UAI) and a military standard-1760 (MIL-STD-1760) messaging interface, as shown in the flow chart in FIG. 8. The method may be executed as instructions on a machine, computer circuitry, or a processor for the UE, where the instructions are included on at least one computer readable medium or one non-transitory machine readable storage medium. The method includes the operation of translating a UAI transmit message ('T' message) to a legacy 'T' message, as in block 510. The next operation of the method can be translating a legacy receive message ('R' message) to a UAI 'R' message, as in block 520.

In an example, the operation of translating the legacy 'R' message to the UAI 'R' message can further include: reordering, resizing, or reformatting selected fields or commands from the legacy 'R' message for use in the UAI 'R' message; combining selected fields or commands from multiple legacy 'R' messages to generate the UAI 'R' message; or separating selected fields or commands from the legacy 'R' message to generate multiple UAI 'R' messages. The operation of translating the UAI 'T' message to the legacy 'T' message can further include: validating a checksum for the UAI 'T' message, and translating the UAI 'T' message to the legacy 'T' message when the checksum is validated.

In another example, the method can further include: periodically polling the UAI 'T' message for changes, and updating a 'T' message buffer when the UAI 'T' message changes. The method can further include scheduling transmission of the legacy 'T' message to a remote terminal (RT) by a bus controller (BC).

Figure 9:
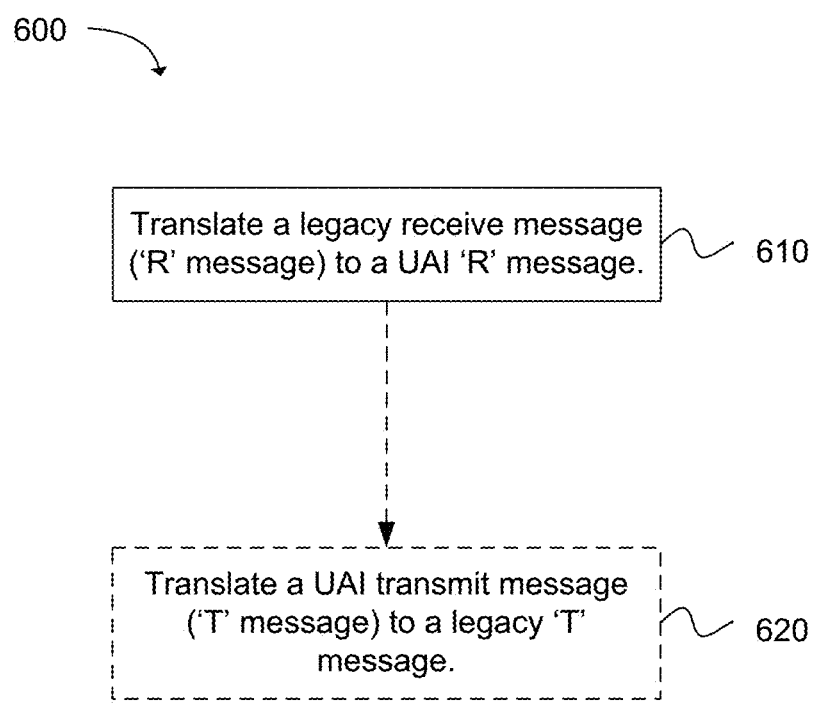
FIG. 9 depicts functionality of computer circuitry of an Universal Armament Interface (UAI) translator for a military standard-1760 (MIL-STD-1760) messaging interface in accordance with an example.

Another example provides functionality 600 of computer circuitry of an Universal Armament Interface (UAI) translator for a military standard-1760 (MIL-STD-1760) messaging interface, as shown in the flow chart in FIG. 9. The functionality may be implemented as a method or the functionality may be executed as instructions on a machine, where the instructions are included on at least one computer readable medium or one non-transitory machine readable storage medium. The computer circuitry can be configured to translate a legacy receive message ('R' message) to a UAI 'R' message, as in block 610. The computer circuitry can be further configured to translate a UAI transmit message ('T' message) to a legacy 'T' message, as in block 620.

In an example, the computer circuitry can be further configured to: buffer the legacy 'R' message to ensure that an incoming legacy 'R' message is stored during the translation of the legacy 'R' message to the UAI 'R' message; or double buffer the 'T' message to ensure that an updated UAI 'T' message is stored, the UAI 'T' message is not updated during the translation of the UAI 'T' message to the legacy 'T' message, and the translated legacy 'T' message is transmitted before being replaced by another legacy 'T' message.

In another example, the computer circuitry configured to translate the UAI 'T' message to the legacy 'T' message can be further configured to: update the legacy 'T' message using selected fields from the UAI 'T' message, where the update reorders, resizes, or reformats the selected fields; combine selected fields from multiple UAI 'T' messages to generate the legacy 'T' message; or separate selected fields from the UAI 'T' message for multiple legacy 'T' messages, where each legacy 'T' message from the multiple legacy 'T' messages includes a field from the UAI 'T' message.

In another configuration, the computer circuitry can be further configured to: receive the legacy 'R' message by a remote terminal (RT) via an interrupt or continuous polling; and schedule transmission of the UAI 'R' message by a bus controller (BC). The computer circuitry configured to translate the legacy 'R' message to the UAI 'R' message can be further configured to: divide message fields or message commands of the legacy 'R' message into at least two UAI instances; and map the message fields and message commands of each UAI instance to a separate UAI 'R' messages.

In another example, the computer circuitry configured to translate the legacy 'R' message to the UAI 'R' message can be further configured to: receive at least two different types of legacy 'R' messages, where each legacy 'R' message type includes a legacy instance including message fields or message commands of the legacy 'R' message; and combine the legacy instances into a single UAI 'R' message.

In another configuration, the computer circuitry configured to translate the legacy 'R' message to the UAI 'R' message can be further configured to: reorder message fields or message commands of the legacy 'R' message for the UAI 'R' message; or resize or reformat the message fields or the message commands of the legacy 'R' message to a size within a UAI word in the UAI 'R' message; or recompute a checksum for a modification to the UAI 'R' message.

In another example, the computer circuitry configured to translate the legacy 'R' message to the UAI 'R' message can be further configured to: receive a legacy time-stamped 'R' message including a conforming to a data latency method of time-stamping defined in MIL-STD-1760; and either recompute the legacy time-stamp in the legacy time-stamped 'R' message to a UAI time-stamp for a UAI time-stamped 'R' message, where the UAI time-stamp conforms to a timetag method of time-stamping defined in a UAI specification, or maintain a timing requirement or computed data latency accuracy of legacy time-stamped 'R' message in the UAI time-stamped 'R' message.

In another configuration, the computer circuitry configured to translate the legacy 'R' message to the UAI 'R' message can be further configured to: verify that subaddress of the legacy 'R' message is defined; validate a checksum for the legacy 'R' message; and translate the legacy 'R' message to the UAI 'R' message when the subaddress is defined and the checksum is validated. In another example, the computer circuitry configured to translate the legacy 'R' message to the UAI 'R' message can be further configured to: determine a specified first word header for the legacy 'R' message; and translate the legacy 'R' message to the UAI 'R' message when a received first word header conforms to an expected specified first word header. In another example, the computer circuitry configured to translate the legacy 'R' message to the UAI 'R' message can be further configured to: receive a periodic legacy 'R' message; and translate the legacy 'R' message to the UAI 'R' message when the periodic legacy 'R' message has a changed state. The UAI 'R' message or the UAI 'T' message uses 1 to 30 16-bit words, and message data and message commands of the legacy 'R' message use message structures and definitions conforming to a legacy weapon Interface Control Document (ICD).

Various techniques, or certain aspects or portions thereof, may take the form of program code (i.e., instructions) embodied in tangible media, such as floppy diskettes, compact disc-read-only memory (CD-ROMs), digital versatile disc (DVD), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The interface bridge device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" or "configuration" means that a particular feature, structure, or characteristic described in connection with the example is included in at least one embodiment of the present invention. Thus, appearances of the phrases "in an example" or "in a configuration" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An Universal Armament Interface (UAI) translator for a legacy military standard-1760 (MIL-STD-1760) messaging interface comprising:
   a legacy interface for receiving a legacy receive message ('R' message) and transmitting a legacy transmit message ('T' message), wherein the legacy interface includes a MIL-STD-1760 remote terminal (RT) messaging interface;
   a UAI for transmitting a UAI 'R' message and receiving a UAI 'T' message;
   a processor for:
      translating the legacy 'R' message to the UAI 'R' message;
      translating the UAI 'T' message to the legacy 'T' message;
   an 'R' message buffer to buffer the legacy 'R' message from an incoming legacy 'R' message during translation to the UAI 'R' message;
   a bus controller (BC) 'T' message buffer to copy the UAI 'T' message from an updated UAI 'T' message during translation to the legacy 'T' message; and
   a remote terminal (RT) 'T' message buffer to buffer the legacy 'T' message after translation from the UAI 'T' message until the legacy 'T' message is transmitted.

2. The UAI translator of claim 1, wherein the legacy 'R' message and the legacy 'T' message of the legacy interface use a message format for an MIL-STD-1760 precision guided munitions (PGM) mission store, wherein the MIL-STD-1760 precision guided munitions mission store include Guided Bomb Unit-31/32/38 (GBU-31/32/38) Joint Direct Attack Munitions (JDAM); Air-to-Ground Missile-154 (AGM-154) Joint Standoff Weapon (JSOW); Enhanced GBU-24/27/28/49 (EGBU-24/27/28/49) Enhanced Paveway™; Cluster Bomb Unit-103 (CBU-103), CBU-104, or CBU-105 Wind Corrected Munitions Dispensers (WCMDs); Air-launched Decoy Missile-160B/C (ADM-160B/C) Miniature Air Launched Decoy (MALD); or AGM-158 Joint Air-to-Surface Stand-Off Missile (JASSM).

3. The UAI translator of claim 1, wherein the legacy interface provides an aircraft-side logical interface, and the UAI provides a weapon-side logical interface.

4. An Universal Armament Interface (UAI) translator for a military standard-1760 (MIL-STD-1760) messaging interface having computer circuitry configured to:
   translate a legacy receive message ('R' message) to a UAI 'R' message;
   buffer the legacy 'R' message to ensure that an incoming legacy 'R' message is stored during the translation of the legacy 'R' message to the UAI 'R' message;
   translate a UAI transmit message ('T' message) to a legacy 'T' message; and
   double buffer the 'T' message to ensure that an updated UAI 'T' message is stored, the UAI 'T' message is not updated during the translation of the UAI 'T' message to the legacy 'T' message, and the translated legacy 'T' message is transmitted before being replaced by another legacy 'T' message.

5. The computer circuitry of claim 4, wherein the computer circuitry configured to translate the UAI 'T' message to the legacy 'T' message is further configured to:
   update the legacy 'T' message using selected fields from the UAI 'T' message, wherein the update reorders, resizes, or reformats the selected fields;
   combine selected fields from multiple UAI 'T' messages to generate the legacy 'T' message; or
   separate selected fields from the UAI 'T' message for multiple legacy 'T' messages, wherein each legacy 'T' message from the multiple legacy 'T' messages includes a field from the UAI 'T' message.

6. The computer circuitry of claim 4, further configured to:
   receive the legacy 'R' message by a remote terminal (RT) via an interrupt or continuous polling; and
   schedule transmission of the UAI 'R' message by a bus controller (BC).

7. The computer circuitry of claim 4, wherein the computer circuitry configured to translate the legacy 'R' message to the UAI 'R' message is further configured to:
   divide message fields or message commands of the legacy 'R' message into at least two UAI instances; and
   map the message fields and message commands of each UAI instance to a separate UAI 'R' messages.

8. The computer circuitry of claim 4, wherein the computer circuitry configured to translate the legacy 'R' message to the UAI 'R' message is further configured to:
   receive at least two different types of legacy 'R' messages, wherein each legacy 'R' message type includes a legacy instance including message fields or message commands of the legacy 'R' message; and
   combine the legacy instances into a single UAI 'R' message.

9. The computer circuitry of claim 4, wherein the computer circuitry configured to translate the legacy 'R' message to the UAI 'R' message is further configured to:
- reorder message fields or message commands of the legacy 'R' message for the UAI 'R' message; or
- resize or reformat the message fields or the message commands of the legacy 'R' message to a size within a UAI word in the UAI 'R' message; or
- recompute a checksum for a modification to the UAI 'R' message.

10. The computer circuitry of claim 4, wherein the computer circuitry configured to translate the legacy 'R' message to the UAI 'R' message is further configured to:
- receive a legacy time-stamped 'R' message conforming to a data latency method of time-stamping defined in MIL-STD-1760; and either
- recompute the legacy time-stamp in the legacy time-stamped 'R' message to a UAI time-stamp for a UAI time-stamped 'R' message, wherein the UAI time-stamp conforms to a timetag method of time-stamping defined in a UAI specification, or
- maintain a timing requirement or computed data latency accuracy of legacy time-stamped 'R' message in the UAI time-stamped 'R' message.

11. The computer circuitry of claim 4, wherein the computer circuitry configured to translate the legacy 'R' message to the UAI 'R' message is further configured to:
- verify that subaddress of the legacy 'R' message is defined;
- validate a checksum for the legacy 'R' message; and
- translate the legacy 'R' message to the UAI 'R' message when the subaddress is defined and the checksum is validated.

12. The computer circuitry of claim 4, wherein the UAI message or the UAI 'T' message uses 1 to 30 16-bit words, and message data and message commands of the legacy 'R' message use message structures and definitions conforming to a legacy weapon Interface Control Document (ICD).

13. A method for translating between and Universal Armament Interface (UAI) and a military standard-1760 (MIL-STD-1760) messaging interface, comprising:
- translating a UAI transmit message ('T' message) to a legacy 'T' message; and
- translating a legacy receive message ('R' message) to a UAI 'R' message, wherein the legacy 'R' message is buffered to ensure that an incoming legacy 'R' message is stored during the translation of the legacy 'R' message to the UAI 'R' message, and wherein translating the legacy 'R' message to the UAI 'R' message further comprises:
  - reordering, resizing, or reformatting selected fields or commands from the legacy 'R' message for use in the UAI 'R' message;
  - combining selected fields or commands from multiple legacy 'R' messages to generate the UAI 'R' message; or
  - separating selected fields or commands from the legacy 'R' message to generate multiple UAI 'R' messages.

14. The method of claim 13, wherein translating the UAI 'T' message to the legacy 'T' message further comprises:
- validating a checksum for the UAI 'T' message; and
- translating the UAI 'T' message to the legacy 'T' message when the checksum is validated.

15. The method of claim 13, further comprising:
periodically polling the UAI 'T' message for changes; and updating a 'T' message buffer when the UAI 'T' message changes.

16. The method of claim 13, further comprising:
scheduling transmission of the legacy 'T' message to a remote terminal (RT).

17. At least one non-transitory machine readable storage medium comprising a plurality of instructions adapted to be executed to implement the method of claim 13.

* * * * *